(12) United States Patent
Maniwa et al.

(10) Patent No.: US 12,509,124 B2
(45) Date of Patent: Dec. 30, 2025

(54) VEHICLE FRONT RECOGNITION APPARATUS AND VEHICLE CONTROL UNIT

(71) Applicant: SUBARU CORPORATION, Tokyo (JP)

(72) Inventors: Hiroki Maniwa, Tokyo (JP); Reo Harada, Tokyo (JP); Hiroaki Kuramochi, Tokyo (JP); Seiya Sato, Tokyo (JP); Shigeki Mukai, Tokyo (JP); Kazuyuki Takahashi, Tokyo (JP); Wataru Munemura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 230 days.

(21) Appl. No.: 18/243,401

(22) Filed: Sep. 7, 2023

(65) Prior Publication Data

US 2024/0092400 A1   Mar. 21, 2024

(30) Foreign Application Priority Data

Sep. 21, 2022 (JP) ................. 2022-149693

(51) Int. Cl.
*B60W 60/00* (2020.01)
*B60W 50/14* (2020.01)
(Continued)

(52) U.S. Cl.
CPC ........ *B60W 60/0053* (2020.02); *B60W 50/14* (2013.01); *G06V 10/764* (2022.01); *G06V 20/56* (2022.01); *B60W 2420/403* (2013.01)

(58) Field of Classification Search
CPC ............ B60W 60/0053; B60W 50/14; B60W 2420/403; G06V 10/764; G06V 10/26; G06V 20/56
(Continued)

(56) References Cited

U.S. PATENT DOCUMENTS

| 11,348,269 B1* | 5/2022 | Ebrahimi Afrouzi ... G01S 17/48 |
| 11,745,764 B2* | 9/2023 | Patel ...................... G01S 17/86 |
| | | 701/23 |

(Continued)

FOREIGN PATENT DOCUMENTS

WO    2020/110915 A1    4/2020

*Primary Examiner* — Krishnan Ramesh
(74) *Attorney, Agent, or Firm* — TROUTMAN PEPPER LOCKE LLP (57) ABSTRACT

A vehicle front recognition apparatus includes an imager that captures an image of an environment ahead of a vehicle on the road, an image analyzer that analyzes the image of the environment with artificial intelligence to segment the image areas of the image by classes to which objects captured in the image belong, and a road information acquirer that acquires high-precision map information ahead of the vehicle. The vehicle front recognition apparatus acquires dynamic information that is not included in the high-precision map information from the classes. The image analyzer includes a feeling-of-strangeness area extractor extracting a feeling-of-strangeness area using the classes from the image areas. The vehicle front recognition apparatus further includes a feeling-of-strangeness area verifier that verifies whether the vehicle can pass through the feeling-of-strangeness area and a notifier that notifies a driver when the vehicle cannot pass through the feeling-of-strangeness area.

6 Claims, 4 Drawing Sheets

(51) Int. Cl.
*G06V 10/764* (2022.01)
*G06V 20/56* (2022.01)

(58) Field of Classification Search
USPC .......................................................... 701/23
See application file for complete search history.

(56) References Cited

U.S. PATENT DOCUMENTS

| | | | |
|---|---|---|---|
| 2011/0276215 A1* | 11/2011 | Wendling | G07C 5/008 |
| | | | 701/1 |
| 2021/0001893 A1* | 1/2021 | Etcheverry | B60W 30/12 |
| 2021/0394753 A1* | 12/2021 | Oh | B60W 30/0956 |
| 2022/0004777 A1* | 1/2022 | Yang | G01S 19/20 |
| 2022/0019813 A1 | 1/2022 | Satoh et al. | |
| 2023/0102095 A1* | 3/2023 | Hsu | B60W 60/0015 |
| | | | 701/23 |
| 2023/0205753 A1* | 6/2023 | Laska | H04N 7/181 |
| 2023/0209206 A1* | 6/2023 | Bharwani | H04N 23/71 |
| | | | 382/104 |
| 2023/0386167 A1* | 11/2023 | Fuelster | G06V 10/776 |
| 2024/0010220 A1* | 1/2024 | Kim | G07C 5/06 |
| 2024/0034362 A1* | 2/2024 | Oba | B60W 60/0051 |
| 2024/0062505 A1* | 2/2024 | Mishima | G08G 1/165 |
| 2024/0166239 A1* | 5/2024 | Liu | B60W 60/0015 |
| 2024/0273916 A1* | 8/2024 | Mimoun | B60W 40/06 |
| 2025/0006055 A1* | 1/2025 | Hu | B60W 30/06 |

* cited by examiner

VEHICLE FRONT RECOGNITION APPARATUS AND VEHICLE CONTROL UNIT

CROSS-REFERENCE TO RELATED APPLICATION

The present application claims priority from Japanese Patent Application No. 2022-149693 filed on Sep. 21, 2022, the entire contents of which are hereby incorporated by reference.

BACKGROUND

The disclosure relates to a vehicle front recognition apparatus that performs image analysis of an image resulting from capturing of a running environment ahead of a vehicle to be applied with artificial intelligence and a vehicle control unit.

In an automated driving system, artificial intelligence (AI) controls driving in a specific automated driving area, instead of a driver who drives a vehicle to be applied. At this time, the current position of the vehicle (vehicle position) is estimated from matching with high-precision map information (dynamic map) stored in a map server based on positional information received from a positioning satellite, such as a global navigation satellite system (GNSS) satellite typified by a global positioning system (GPS) satellite.

The high-precision map information has a hierarchical structure in which additional map information for supporting autonomous driving is superimposed on a static information layer, which is the bottom base layer. High-precision three-dimensional map information having a little amount of change (road surface information, lane information, positional information about buildings, and so on) is stored in the static information layer.

The additional map information is classified into three layers, which sequentially include a semi-static information layer, a semi-dynamic information layer, and a dynamic information layer from the bottom. The respective layers are classified depending on the degree of change (variation) on a time axis. Among the layers, in the dynamic information layer, information that is varied in real time, such as identification of objects (surrounding vehicles, bicycles, persons, and so on) and positional information about the objects, is updated, for example, every second or more often.

The dynamic information layer is not set in the current high-precision map information. Accordingly, the automated driving system acquires the dynamic information from the result of analysis and inference by the artificial intelligence (AI) of a real-time image ahead of the vehicle, which is captured by an in-vehicle camera. For example, International Publication 2020/110915 discloses a technique to determine, in identification of the movable body, which is the dynamic information, using the AI, which class (category), such as a vehicle, a person, or the like, each pixel in an image belongs to based on the degree of coincidence between dictionary data (learned data) for movable body identification, which is based on the shape and/or another feature information about an actual movable body, and the movable body in the image using semantic segmentation.

SUMMARY

An aspect of the disclosure provides a vehicle front recognition apparatus to be applied to a vehicle. The vehicle front recognition apparatus includes an imager, an image analyzer, and a road information acquirer. The imager is configured to capture an image of an environment ahead of the vehicle when the vehicle travels on a road. The image analyzer is configured to analyze the image of the environment with artificial intelligence to segment image areas of the image by classes to which objects captured in the image belong. The road information acquirer is configured to acquire high-precision map information ahead of the vehicle. The vehicle front recognition apparatus is configured to acquire, from the classes analyzed by the image analyzer, dynamic information that is not included in the high-precision map information. The image analyzer comprises a feeling-of-strangeness area extractor configured to extract a first image area from among the image areas as a feeling-of-strangeness area. The first image area belongs to none of the classes. The vehicle front recognition apparatus further includes a feeling-of-strangeness area verifier and a notifier. The feeling-of-strangeness area verifier is configured to verify whether the vehicle can pass through the feeling-of-strangeness area. The notifier is configured to, when the feeling-of-strangeness area verifier determines that the vehicle cannot pass through the feeling-of-strangeness area, notify a driver who drives the vehicle that the vehicle cannot pass through the feeling-of-strangeness area.

An aspect of the disclosure provides a vehicle control unit. The vehicle control unit includes the vehicle front recognition apparatus and a vehicle controller. The vehicle controller is configured to switch driving modes including an automated driving mode and a manual driving mode. The vehicle controller is configured to, when the feeling-of-strangeness area verifier determines that the vehicle cannot pass through the feeling-of-strangeness area, change the driving mode from the automated driving mode to the manual driving mode.

An aspect of the disclosure provides a vehicle front recognition apparatus to be applied to a vehicle. The vehicle front recognition apparatus includes an imager and first circuitry. The imager includes a camera and is configured to capture an image of an environment ahead of the vehicle when the vehicle travels on a road. The first circuitry is configured to analyze the captured image of the environment with artificial intelligence to segment image areas of the image by classes to which objects captured in the image belong. The first circuitry is configured to acquire high-precision map information ahead of the vehicle. The vehicle front recognition apparatus is configured to acquire, from the classes, dynamic information that is not included in the acquired high-precision map information. The first circuitry is further configured to: extract from among the image areas a first image area as a feeling-of-strangeness area that belongs to none of the classes; verify whether the vehicle can pass through the extracted feeling-of-strangeness area; and, upon determining that the vehicle cannot pass through the feeling-of-strangeness area, notify a driver who drives the vehicle that the vehicle cannot pass through the feeling-of-strangeness area.

An aspect of the disclosure provides a vehicle control unit. The vehicle control unit includes the vehicle front recognition apparatus and second circuitry. The second circuitry is configured to switch driving modes including an automated driving mode and a manual driving mode. The circuitry is configured to, when the first circuitry determines that the vehicle is cannot pass through the feeling-of-strangeness area, change the driving mode from the automated driving mode to the manual driving mode.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the identification of an object through image analysis by the AI using the semantic segmentation or the like, an object having a predetermined shape, such as a vehicle, a bicycle, or a person, has a large amount of accumulated leaning data and can be identified through high-accuracy inference. However, the accuracy of inference of an object having a small amount of accumulated learning data is low and it is difficult to accurately identify such an object.

When the AI identifies an object on a road as a solid obstacle based on a smaller amount of accumulated learning data, avoidance control, such as turning of a steering wheel, is performed in the automated driving system even if the object is a garbage bag, a cap, or a hat. However, when the automated driving system has performed the avoidance control of a vehicle to be applied in a state in which a driver who drives the vehicle recognizes the object as a garbage bag, a cap, or a hat, control against the intention of the driver is performed. Accordingly, the driver may feel a feeling of strangeness.

It is desirable to provide a vehicle front recognition apparatus that does not perform control based on false inference by the AI and that can prevent a control operation against the intention of a driver who drives a vehicle to be applied even without learning of an object having difficulty in identification of its shape and having difficulty in accumulation of its learning data.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
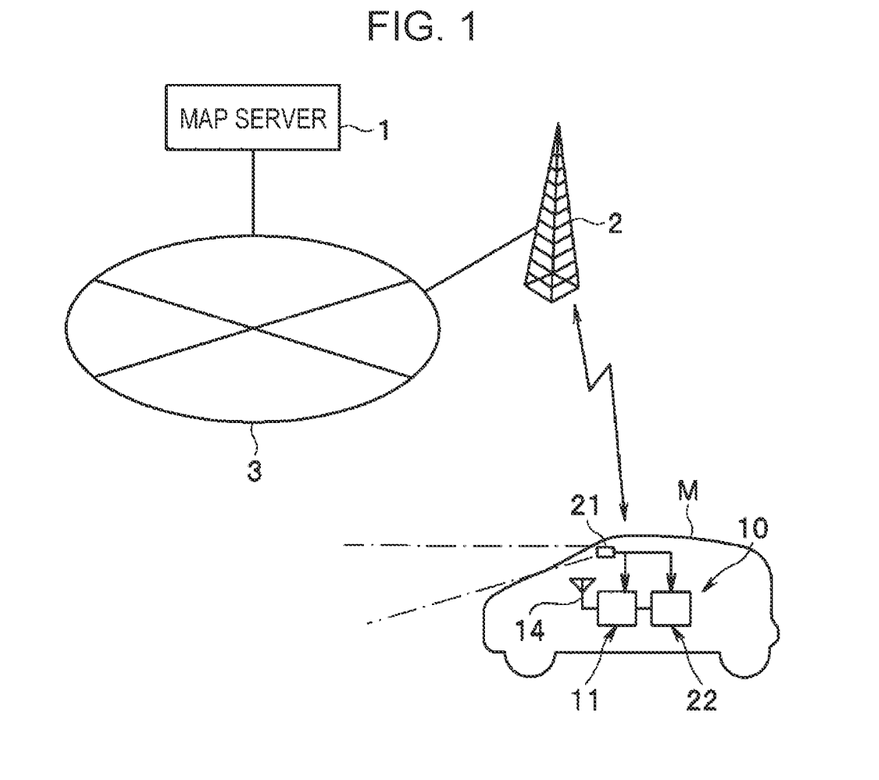
FIG. 1 is a diagram schematically illustrating a configuration of a high-precision map information providing system.
Figure 2:
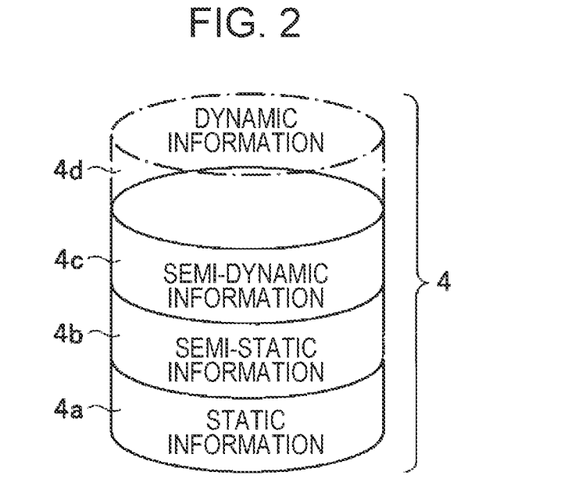
FIG. 2 is an explanatory diagram illustrating the concept of a dynamic map.

A high-precision map information providing system illustrated in FIG. 1 includes a map server 1 and a base station 2, which are connected to each other via the Internet 3. The map server 1 delivers high-precision map information (a global dynamic map) from the base station 2 to a vehicle (typified by a vehicle M to be applied in FIG. 1) that performs automated driving via the Internet 3. As illustrated in FIG. 2, high-precision map information (global dynamic map) 4 has a hierarchical structure in which additional map information for supporting autonomous driving is superimposed on a static information layer 4a, which is the bottom base layer.

The static information layer 4a is high-precision three-dimensional map information and is the bottom base information layer in which static information having a smallest amount of change, such as road surface information, lane information, intersection information, information about three-dimensional structures, and permanent restriction information, is stored. The additional map information superimposed on the static information layer 4a is classified into three layers which sequentially include a semi-static information layer 4b, a semi-dynamic information layer 4c, and a dynamic information layer 4d from the bottom. The respective layers 4a to 4d are classified depending on the degree of change (variation) on a time axis. Information on the respective layers 4a to 4d is sequentially updated every predetermined period (time). Since the static information on the static information layer 4a has a small amount of change, the static information is updated on a cycle of one month or less. Information in which the state of a variable event is planned or estimated in advance and which has a larger amount of change than that of the static information layer 4a but has a smallest amount of dynamic change is stored in the semi-static information layer 4b. The semi-static information includes, for example, a time schedule of lane restriction due to works, a time schedule of seasonal event restriction, prediction of traffic jams, and wide-area weather forecasting. Since the semi-static information has a smaller amount of dynamic change, the semi-static information is updated on a cycle of one hour or less.

Information (dynamic information) about a sudden even that is not scheduled or estimated, which has a larger amount of dynamic change than that of the semi-static information layer 4b, is stored in the semi-dynamic information layer 4c. The semi-dynamic information includes, for example, accident information, traffic jam information, and narrow-area weather information, such as torrential rain. Since the semi-dynamic information has a larger amount of dynamic change, the semi-dynamic information is updated on a cycle of one minute or less.

The dynamic information on the dynamic information layer 4d has a largest amount of change and is updated in real time on a cycle of one second or less via vehicle-to-vehicle communication, road-to-vehicle communication, pedestrian-to-vehicle communication, or the like. The dynamic information includes, for example, signal indication (lighting color) information, railroad crossing gate information, intersection through traffic information, and in-intersection pedestrian and/or bicycle information. However, as indicated by alternate long and short dash lines in FIG. 2, in the high-precision map information (global dynamic map) 4 stored in the current map server 1, the dynamic information is not stored in the dynamic information layer 4d and is generated in each vehicle (typified by the vehicle M), as described below.

An automated driving system 10 for the automated driving is installed in the vehicle M. The automated driving system 10 includes a locator unit 11, a camera unit 21, which is an imager, and a vehicle control unit 22.

Figure 3:
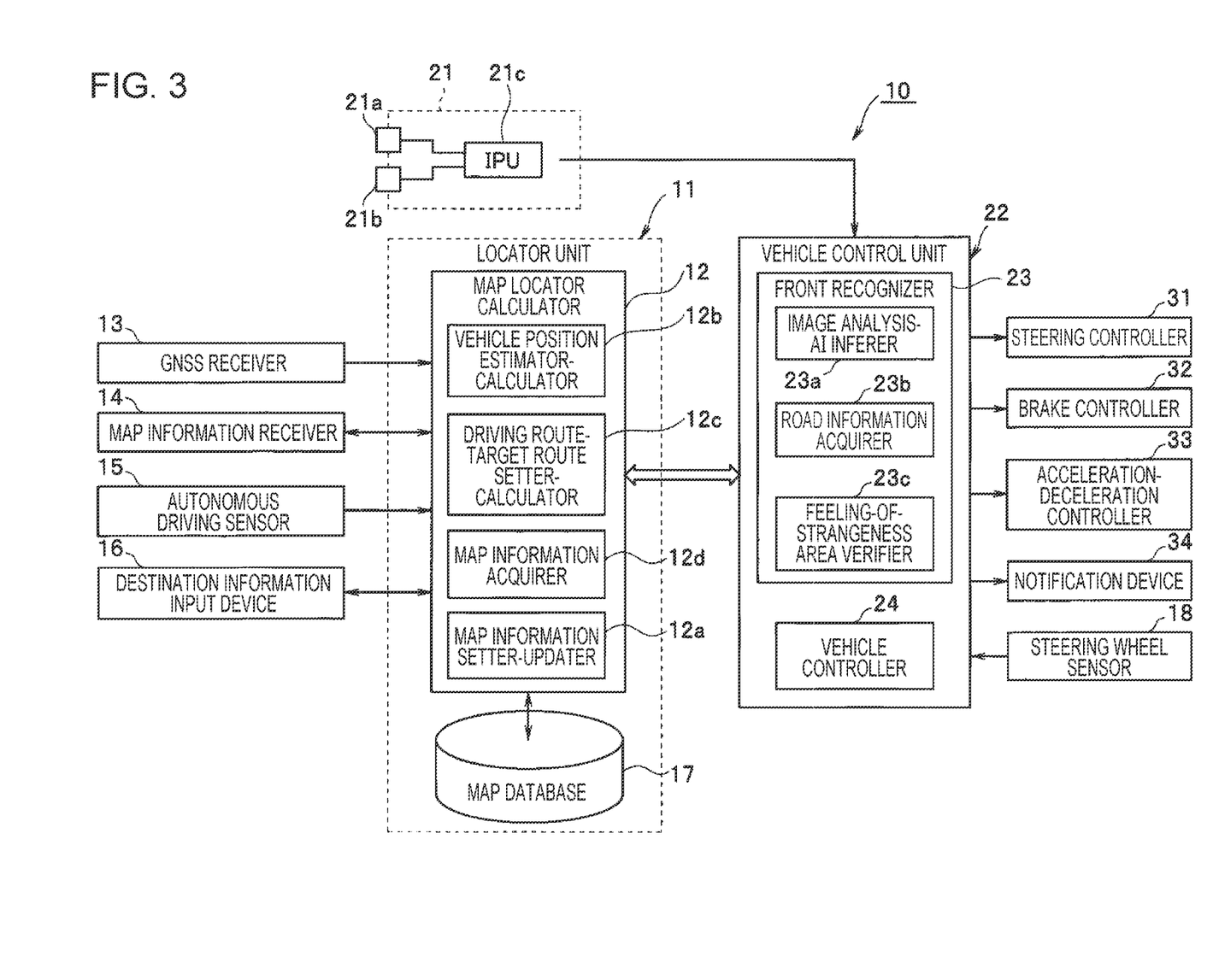
FIG. 3 is a diagram schematically illustrating a configuration of an automated driving system.

FIG. 3 illustrates a configuration of the automated driving system 10 installed in the vehicle M. The locator unit 11 includes a map locator-calculator 12 and a map database 17 composed of a mass storage medium, such as a hard disk drive (HDD). The map locator-calculator 12 and the vehicle control unit 22 are each composed of a microcontroller including a central processing unit (CPU), a random access memory (RAM), a read only memory (ROM), a rewritable non-volatile memory (a flash memory or an electrically erasable programmable read-only memory (EEPROM)), and peripheral devices. Programs for causing the CPU to perform processes, fixed data, and so on are stored in the ROM. The RAM is provided as a working area of the CPU and a variety of data in the CPU is temporarily stored in the RAM. The CPU is also called a micro processing unit (MPU) (microprocessor) or a processor. A graphics processing unit (GPU) or a graph streaming processor (GSP) may be used, instead of the CPU. Alternatively, the CPU, the GPU, and the GSP may be selectively combined for use.

The high-precision map information downloaded from the map server 1 is stored in the map database 17. The high-precision map information is high-precision map information (a local dynamic map) about a partial area used for the autonomous driving of the vehicle M and has the same hierarchical structure as that of the high-precision map information (global dynamic map) 4 stored in the map server 1 illustrated in FIG. 2. The dynamic information to be stored in the dynamic information layer 4d is generated in the vehicle control unit 22.

A global navigation satellite system-global positioning satellite system (GNSS) receiver 13, a map information receiver 14, an autonomous driving sensor 15, and a destination information input device 16 are connected to the input side of the map locator-calculator 12.

The GNSS receiver 13 receives positioning signals transmitted from multiple positioning satellites. The map information receiver 14 accesses the map server 1 to request transmission of the high-precision map information and receives the transmitted high-precision map information.

The autonomous driving sensor 15 enables the autonomous driving in an environment, such as driving in a tunnel, in which the sensibility of reception from the GNSS satellite is low and the positioning signals cannot be received effectively. The autonomous driving sensor 15 is composed of a vehicle speed sensor, a gyro sensor, a forward and backward acceleration sensor, and so on. The map locator-calculator 12 performs localization from the moving distance and the azimuth based on a vehicle speed of the vehicle M, which is detected by the vehicle speed sensor, an angular velocity detected by the gyro sensor, forward and backward acceleration detected by the forward and backward acceleration sensor, and so on.

The destination information input device 16 is an external input device used by the driver driving the vehicle, who is an operator, to input destination information (an address, a telephone number, a facility name, and so on) through an operation on a monitor, sound, or the like. Upon input of the destination information, the map locator-calculator 12 sets a driving route from the current vehicle position to a destination.

The map locator-calculator 12 includes a map information setter-updater 12a, a vehicle position estimator-calculator 12b, a driving route-target route setter-calculator 12c, and a map information acquirer 12d.

The map information setter-updater 12a downloads the static information layer 4a in the high-precision map information (global dynamic map) 4 stored in the map server 1 on a predetermined cycle (for example, on a cycle of one month or less) to update the static information layer in the high-precision map information stored in the map database 17 with the static information layer 4a. The driving route from the vehicle position to the destination in the automated driving is set based on the static information layer, which is the bottom base layer. Accordingly, the entire static information layer in the high-precision map information stored in the map database 17 is updated with the static information layer 4a.

Since it is sufficient for the semi-static information layer 4b and the semi-dynamic information layer 4c in the high-precision map information 4 stored in the map server 1 to include information along a target route described below, the map information setter-updater 12a downloads information about a limited partial area around the vehicle position and around the target route and superimposes the semi-static information layer and the semi-dynamic information layer on the static information layer in the high-precision map information (the local dynamic map) stored in the map database 17 to build the high-precision map information (the local dynamic map) having the hierarchical structure.

The vehicle position estimator-calculator 12b acquires a position coordinate (a latitude, a longitude, and an altitude), which is positional information about the vehicle M, based on the positioning signals received by the GNSS receiver 13. In an environment in which the effective positioning signals from the positioning satellites cannot be received due to reduction in the sensibility of the GNSS receiver 13, the vehicle position estimator-calculator 12b estimates the position coordinate of the vehicle M based on a signal from the autonomous driving sensor 15.

The driving route-target route setter-calculator 12c performs map matching with the static information layer 4a in the high-precision map information based on the position coordinate (the latitude, the longitude, and the altitude) of the vehicle M, which is estimated by the vehicle position estimator-calculator 12b, and the destination information (including route information) input with the destination information input device 16 to identify the vehicle position and the destination. Then, the driving route-target route setter-calculator 12c generates the driving route between the vehicle position and the destination based on the static information stored in the static information layer in the map database 17. Furthermore, the driving route-target route setter-calculator 12c generates the target route on which the vehicle M runs in the automated driving on the generated driving route to a predetermined distance from the vehicle position.

The map information acquirer 12d acquires the high-precision map information (the local dynamic map) from the periphery of the vehicle position to the periphery of the target route, which is stored in the high-precision map information in the map database 17. The high-precision map information is read by a road information acquirer 23b in a front recognizer 23.

The camera unit 21 is fixed to the center of an upper front portion in the cabin of the vehicle M. The camera unit 21 includes an in-vehicle camera (a stereo camera) composed of a main camera 21a and a sub-camera 21b and an image processing unit (IPU) 21c. In one embodiment, the main camera 21a and the sub-camera 21b may serve as an "imager". The main camera 21a and the sub-camera 21b are provided so as to be a symmetrical to each other with the center in the width direction sandwiched therebetween with a predetermined base length. The IPU 21c performs certain image processing to an image of a running environment ahead of the vehicle M, which is captured by the main camera 21a and the sub-camera 21b.

The image processed in the IPU 21c in the camera unit 21 is read by the vehicle control unit 22. The vehicle control unit 22 includes the front recognizer 23 and a vehicle controller 24. The front recognizer 23 includes an image analysis-AI inferer 23a, the road information acquirer 23b, and a feeling-of-strangeness area verifier 23c. In one embodiment, the front recognizer 23 may serve as a "front recognition apparatus" and the image analysis-AI inferer 23a may serve as an "image analyzer".

A steering wheel sensor 18 that detects grasping of a steering wheel by the driver and the camera unit 21 are connected to the input side of the vehicle control unit 22. The steering wheel sensor 18 includes, for example, a torque sensor that detects shaft torque of a steering shaft and a touch sensor provided for the steering wheel. The vehicle control unit 22 is connected to the map locator-calculator 12 so as to allow two-way communication via an in-vehicle communication line (for example, a controller area network (CAN)).

A steering controller 31, a brake controller 32, an acceleration-deceleration controller 33, and a notification device 34 are connected to the output side of the vehicle control unit 22. The steering controller 31 causes the vehicle M to run along the target route. The brake controller 32 decelerates the vehicle M through forced brake control. The acceleration-deceleration controller 33 controls the vehicle speed of the vehicle M. The notification device 34 is, for example, a monitor or a speaker and visually and auditorily notifies the driver of switching of a driving mode and the like.

The image analysis-AI inferer 23a in the front recognizer 23 first reads the image processed in the IPU 21c in the camera unit 21, performs image recognition of a captured image of an object with the artificial intelligence (AI), and segments the image into image areas of belonging classes (categories). The AI inference is performed through a method, such as the semantic segmentation, using a learned model (dictionary data) of a deep neural network (DNN). For example, in the sematic segmentation, each pixel in the entire image of the object is labeled with a class (category) to segment the image into the image areas of the respective classes.

Figure 5A:
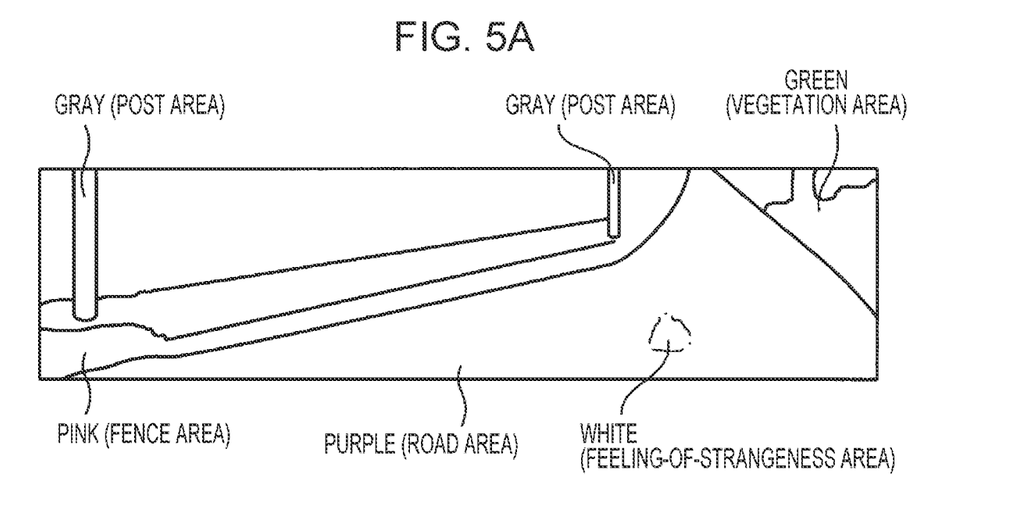
FIG. 5A is an exemplary diagram illustrating a state in which an image is segmented into classes of image areas including no dynamic information through sematic segmentation.
Figure 5B:
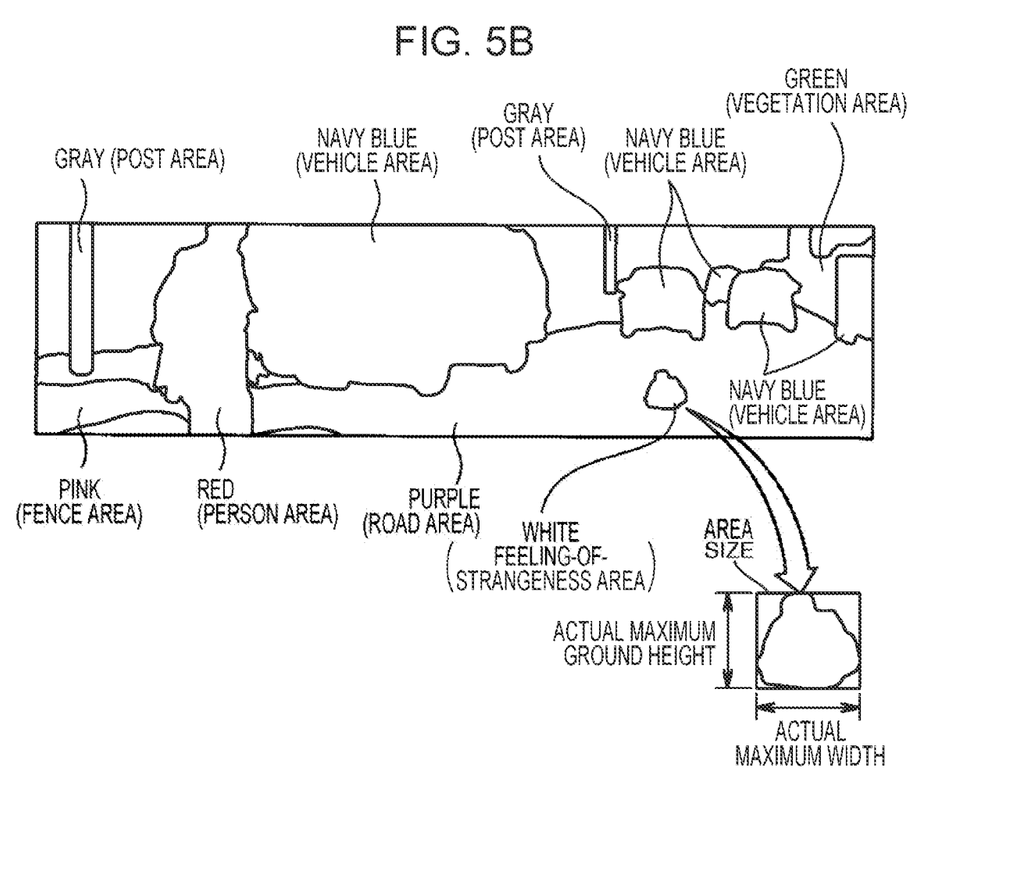
FIG. 5B is an exemplary diagram illustrating a state in which an image is segmented into classes of image areas including the dynamic information through the sematic segmentation.

FIG. 5A and FIG. 5B illustrate exemplary results of the segmentation into the image areas of the respective classes in the sematic segmentation for an entire image captured by the camera unit 21. The classes to which the respective image areas resulting from the segmentation belong are practically color-coded in FIG. 5A and FIG. 5B. For example, a post area is represented in gray, a fence area is represented in pink, a road area is represented in purple, a vegetation area is represented in green, a person area is represented in red, and a vehicle area is represented in navy blue.

When the image of a road includes an image area having difficulty in inference of its class with the AI, the class to which the image area belong is classified into a feeling-of-strangeness area and is represented in white. The feeling-of-strangeness area is, for example, an area in the image of the road, the shape of which is not identified and which has difficulty in creation of its learning data. The feeling-of-strangeness area corresponds to, for example, a fallen object, such as a garbage bag. Although the respective classes are substantially matched with the objects registered in the high-precision map information (the static information, the semi-static information, and the semi-dynamic information) in the map database 17, the feeling-of-strangeness area is matched with no object registered in the high-precision map information (the static information, the semi-static information, and the semi-dynamic information) in the map database 17. In one embodiment, the image analysis-AI inferer 23a in the front recognizer 23 may serve as a "feeling-of-strangeness area extractor".

The image analysis-AI inferer 23a temporarily stores the image areas segmented into the classes in the non-volatile memory. For example, in the image areas illustrated in FIG. 5A and FIG. 5B, the post area, the fence area, and the road area are classified into the static information layer, the vegetation is classified into the semi-static information layer, and the vehicle (and a two-wheel vehicle) and the person are classified into the dynamic information layer.

The road information acquirer 23b reads the high-precision map information (the static information, the semi-static information, and the semi-dynamic information) from the periphery of the vehicle position to the periphery of the target route, which is acquired by the map information acquirer 12d in the map locator-calculator 12.

The feeling-of-strangeness area verifier 23c compares the result of the AI inference in the image analysis-AI inferer 23a with the high-precision map information read by the road information acquirer 23b. If the feeling-of-strangeness area that is not matched exists in the image analysis-AI inferer 23a, the feeling-of-strangeness area verifier 23c verifies whether the vehicle M can pass through the feeling-of-strangeness area. The verification of the feeling-of-strangeness area by the feeling-of-strangeness area verifier 23c is processed according to a feeling-of-strangeness area verification routine illustrated in FIG. 4.

Figure 4:
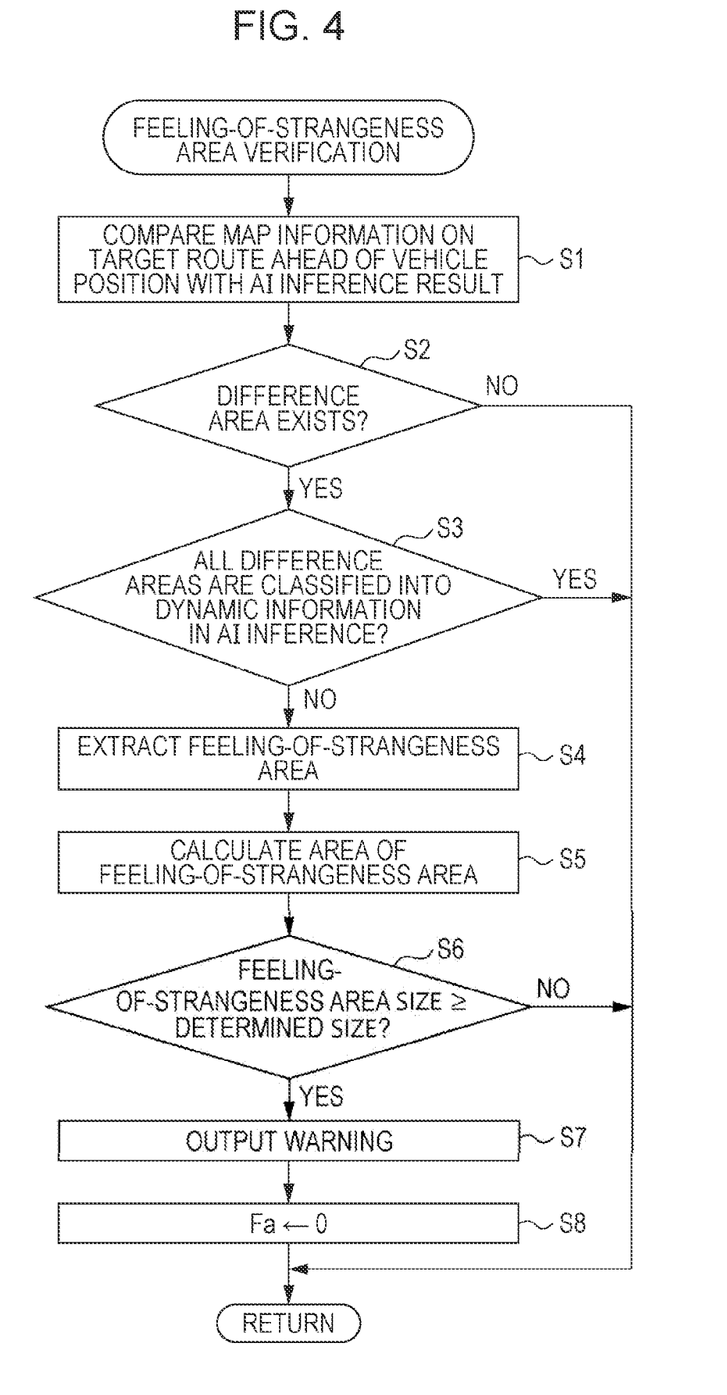
FIG. 4 is a flowchart illustrating a feeling-of-strangeness area verification routine.

Referring to the routine in FIG. 4, in Step S1, the AI inference is performed by the image analysis-AI inferer 23a and the image areas segmented into the respective classes, which is stored in the non-volatile memory, are read. In addition, the result of the AI inference around the target route, which is read by the road information acquirer 23b, and the high-precision map information in the same area are read. Then, the high-precision map information is compared with the image areas segmented into the respective classes in the AI inference.

In Step S2, it is determined whether any difference area exists as the result of the comparison between the high-precision map information and the image areas segmented into the respective classes in the AI inference. If all the image areas segmented into the respective classes exist in the high-precision map information (NO in Step S2), as illustrated in FIG. 5A, it is determined that no difference area exists. Then, the routine illustrated in FIG. 4 is terminated. At this time, if the feeling-of-strangeness area indicated by an alternate long and short dash line in FIG. 5A corresponds to, for example, equipment (for example, an arrow board or a pylon) indicating the lane restriction and cannot be inferred with the AI but the positional information is matched with any of the static information, the semi-static information, and the semi-dynamic information in the high-precision map information, it is determined that no difference area exists.

If the image area that is not stored in the high-precision map information (the dynamic information for the person area and the vehicle area and the feeling-of-strangeness area) exists in the image areas on the road, which are segmented into the respective classes (YES in Step S2), as illustrated in FIG. 5B, it is determined that the difference area exists. Then, the routine goes to Step S3.

In Step S3, it is determined whether all the difference areas belong to the classes (the vehicle, the person, or the like) classified into the dynamic information in the AI inference. If it is determined that all the difference areas belong to the classes classified into the dynamic information (YES in Step S3), the routine illustrated in FIG. 4 is terminated. If it is determined that the difference areas include the feeling-of-strangeness area, which is not classified into the class of the dynamic information in the AI inference (refer to FIG. 5B) (NO in Step S3), the routine goes to Step S4.

In Step S4, the feeling-of-strangeness area that is not classified into the dynamic information (refer to FIG. 5B) is extracted. In Step S5, the size of the feeling-of-strangeness area is calculated. As illustrated in FIG. 5B, the size of the feeling-of-strangeness area is represented as a rectangular area having an actual maximum width and an actual maximum ground height of the feeling-of-strangeness area.

The maximum width and the maximum ground height is calculated, for example, in the following manner:
1) The number of pixels of the maximum width and the number of pixels of the maximum ground height on an imaging plane of the main camera 21a are calculated.
2) The actual distance at a pixel pitch on the imaging plane is calculated from the ratio between the distance from the imaging plane of the main camera 21a to the focal point and the distance from the focal point to the feeling-of-strangeness area.
3) The number of pixels of the maximum width and the number of pixels of the maximum ground height are multiplied by the actual distance to calculate the actual maximum width and the actual maximum ground height.

In Step S6, the size of the feeling-of-strangeness area is compared with a passable determined size. The passable determined size is a value used to determine whether the vehicle M cannot continue the automated driving without avoiding the feeling-of-strangeness area. In other words, the passable determined size is a value at which a lower vehicle body between the left and right wheels can pass while the vehicle M does not contact with the feeling-of-strangeness area. The passable determined size is a fixed value determined by a passable width and a passable ground height, which are set in advance for each vehicle type.

If the size of the feeling-of-strangeness area is smaller than the passable determined size (the actual maximum width<the passable width and the actual maximum ground height<the passable ground height) (NO in Step S6), it is determined that the vehicle M cannot pass through the feeling-of-strangeness area. Then, the routine illustrated in FIG. 4 is terminated. If the size of the feeling-of-strangeness area is greater than or equal to the passable determined size (the actual maximum width the passable width and the actual maximum ground height the passable ground height) (YES in Step S6), it is determined that the vehicle M cannot pass through the feeling-of-strangeness area. Then, the routine goes to Step S7.

In Step S7, the feeling-of-strangeness area verifier 23c outputs a warning signal to the notification device 34 to alert the driver that it is not possible to determine whether the vehicle M can pass through the feeling-of-strangeness area ahead of the vehicle M. In Step S8, an automated driving flag Fa is cleared (Fa←0). Then, the routine illustrated in FIG. 4 is terminated. The warning in Step S7 is issued at least five seconds before the vehicle M reaches the feeling-of-strangeness area in consideration of the time when the driver takes over the driving in transition of the driving mode from an automated driving mode to a manual driving mode.

The automated driving flag Fa is read by the vehicle controller 24. The vehicle controller 24 has the automated driving mode and the manual driving mode as the driving mode. When the automated driving flag Fa is set (Fa=1), the vehicle controller 24 performs the automated driving along the target route in an automated driving zone based on the result of the AI inference in the image analysis-AI inferer 23a and the high-precision map information ahead of the vehicle M, which is read by the road information acquirer 23b.

When the automated driving flag Fa is cleared (Fa=0), the vehicle controller 24 changes the driving mode to the manual driving mode to make the transition to the driving operation by the driver. Even in the state in which the driving mode is changed to the manual driving mode, the vehicle controller 24 can perform a variety of driving support control including advanced emergency braking (AEB), adaptive cruise control (ACC), and active lane keeping bouncing (ALKB).

As described above, according to the present embodiment, the entire image captured by the camera unit 21 is segmented into the classes of the image areas in the image analysis-AI inferer 23a in the front recognizer 23. At this time, the image area of the object that has a smaller amount of learning data and that has no corresponding class is classified into the feeling-of-strangeness area.

Then, the road information ahead of the vehicle M, which is read by the road information acquirer 23b, is compared with the result of the AI inference in the feeling-of-strangeness area verifier 23c. If the difference area from the high-precision map information other than the dynamic information exists in the result of the AI inference, the difference area is extracted as the feeling-of-strangeness area. If it is determined that it is difficult for the vehicle M to pass through the size of the feeling-of-strangeness area, an alert is announced to the driver and the driving mode is changed to the manual driving mode.

As a result, according to the present embodiment, control based on false inference is not performed by the AI and it is possible to prevent a control operation against the intention of the driver even without learning of the object having difficulty in identification of its shape and having difficulty in accumulation of its learning data.

The disclosure is not limited to the embodiments described above. For example, the information (the position, the shape, the size, and so on) about the feeling-of-strangeness area, acquired by the vehicle M, may be supplied to a subsequent vehicle via the vehicle-to-vehicle communication, the road-to-vehicle communication, or the like.

The invention claimed is:

1. A vehicle front recognition apparatus to be applied to a vehicle, the vehicle front recognition apparatus comprising:
   an imager comprising a camera and configured to capture an image of an environment ahead of the vehicle when the vehicle travels on a road;
   one or more processors; and
   one or more memories storing instructions causing the one or more processors to:
      analyze the image of the environment with artificial intelligence to segment image areas of the image by classes to which objects captured in the image belong;

acquire high-precision map information ahead of the vehicle;

compare the image areas with the high-precision map information;

extract a first area among the image areas that satisfies the following conditions (i) and (ii):
  (i) the high-precision map information does not include information corresponding to the first area; and
  (ii) the first area is not classified into a dynamic information in an inference of the artificial intelligence;

calculate a width and a height from a road surface of a second area in a real space, the second area being corresponding to the first area;

determine whether the width of the second area is less than a predetermined first value and whether the height from the road surface of the second area is less than a predetermined second value; and in response to determining that the width of the second area is not less than the predetermined first value or the height from the road surface of the second area is not less than the predetermined second value, notify a driver who drives the vehicle that the vehicle cannot pass through the second area and cause the vehicle to change a driving mode from an automated driving mode to a manual driving mode.

2. A vehicle control unit comprising:
the vehicle front recognition apparatus according to claim 1; and
a vehicle controller configured to switch driving modes including the automated driving mode and the manual driving mode.

3. The vehicle front recognition apparatus according to claim 1, wherein, in the inference of the artificial intelligence, the dynamic information is associated with information in which vehicles and persons are classified.

4. A vehicle front recognition apparatus to be applied to a vehicle, the vehicle front recognition apparatus comprising:
an imager comprising a camera and configured to capture an image of an environment ahead of the vehicle when the vehicle travels on a road; and first circuitry configured to
  analyze the captured image of the environment with artificial intelligence to segment image areas of the image by classes to which objects captured in the image belong;
  acquire high-precision map information ahead of the vehicle;
  compare the image areas with the high-precision map information;
  extract a first area among the image areas that satisfies the following conditions (i) and (ii):
    (i) the high-precision map information does not include information corresponding to the first area; and
    (ii) the first area is not classified into a dynamic information in an inference of the artificial intelligence;
  calculate a width and a height from a road surface of a second area in a real space, the second area being corresponding to the first area;
determine whether the width of the second area is less than a predetermined first value and whether the height from the road surface of the second area is less than a predetermined second value; and
  in response to determining that the width of the second area is not less than the predetermined first value or the height from the road surface of the second area is not less than the predetermined second value, notify a driver who drives the vehicle that the vehicle cannot pass through the second area and cause the vehicle to change a driving mode from an automated driving mode to a manual driving mode.

5. A vehicle control unit comprising:
the vehicle front recognition apparatus according to claim 4; and
second circuitry configured to switch driving modes including the automated driving mode and the manual driving mode.

6. The vehicle front recognition apparatus according to claim 4, wherein, in the inference of the artificial intelligence, the dynamic information is associated with information in which vehicles and persons are classified.

* * * * *